United States Patent Office 3,547,923
Patented Dec. 15, 1970

3,547,923
PIPERAZYL ETHYL 7H-BENZOCYCLOHEPTENES
Robert Ted Standridge and Barbara Ann Hall, Syracuse, N.Y., assignors to Bristol-Myers Company, New York, N.Y., a corporation of Delaware
No Drawing. Filed Mar. 25, 1968, Ser. No. 715,518
Int. Cl. C07d 51/70
U.S. Cl. 260—268
6 Claims

ABSTRACT OF THE DISCLOSURE 8,9-dihydro-6-{2 - [4 - (2 - (lower) - alkoxyphenyl)-1-piperazyl] - ethyl}-7H-benzocycloheptenes and the non-toxic, pharmaceutically acceptable salts thereof are compounds useful as central nervous system depressants, i.e., sedatives, tranquilizers, calmatives, etc., in mammals, including man.

A preferred compound of the disclosure is 8,9-dihydro-2-fluoro-6-{2-[4-(2-methoxyphenyl)-1-piperazyl] - ethyl}-7H-benzocycloheptene and its nontoxic pharmaceutically acceptable salts.

BACKGROUND OF THE INVENTION

(1) Field of the invention

This invention relates to new central nervous system depressants and their nontoxic pharmaceutically acceptable salts.

(2) Description of the prior art (a) Tarbell, Wilson and Ott in the J. Am. Chem. Soc., 74, 6263 (1952) report the preparation of

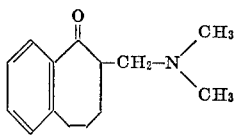

No biological activity is reported for the compound.

(b) Protiva, Jilek and Borovicka, Chemical Abstracts, 47, 4337 (1953), and Fujita, Chemical Abstracts, 53 21852 (1959), report the following compound to have weak antispasmotic activity

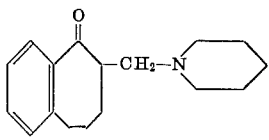

(c) Hach, Horakova and Protiva, Chemical Abstracts, 50, 1739 (1956), report the p-aminobenzoate of the following compound to be a local anesthetic.

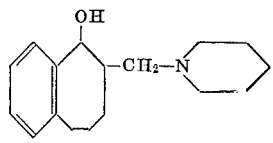

(d) Knoll, Arch, Exptl, Path. Pharmacol., 236, 92 (1959), report the following compound to possess tranqualizing activity

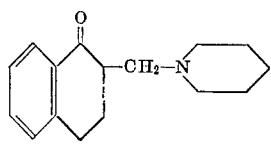

SUMMARY OF THE INVENTION

The compounds of the present invention are characterized as having the formula

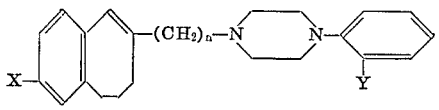

in which X is fluoro or hydrogen, Y is (lower)alkoxy and $n$ is an integer of 2 or 3; and the nontoxic, pharmaceutically-acceptable salts thereof.

COMPLETE DISCLOSURE

This invention relates to chemical compounds useful as central nervous system depressants, i.e., calmatives, sedatives, tranquilizers; etc. in mammals, including man.

The compounds of the present invention are characterized as having the formula

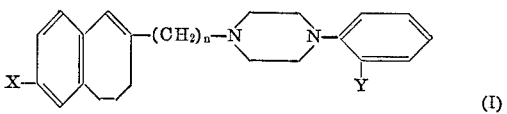
(I)

in which X is fluoro or hydrogen, Y is (lower)alkoxy and $n$ is an integer of 2 or 3; and a nontoxic, pharmaceutically acceptable salt thereof.

The term (lower)alkoxy for the purpose of this specification shall mean an alkoxy group composed of one to four carbon atoms and shall include methoxy, ethoxy, propoxy, isopropoxy, n-butoxy, isobutoxy and t-butoxy, but preferably methoxy and ethoxy.

The nontoxic salts that are pharmaceutically acceptable include the hydrochlorides, hydrobromides, hydriodides, (lower)alkylsulfates, (lower)alkyl and aryl sulfonates, phosphates, sulfates, maleates, fumarates, succinates, tartrates, citrates, and others commonly used in the art.

The salts obtained through the variation of the acid used may in some cases have special advantage due to increased solubility, decreased solubility, ease of crystallization, lack of objectionable taste, etc., but these are all subsidiary to the main physiological action of the free base which is independent of the character of the acid used in the preparation of the salt.

The compounds of the present invention may be embodied in any of the known pharmaceutical forms for oral, parenteral or rectal administration. The compounds may be prepared in solid compositions for oral administration in unit dosage form as tablets, capsules, pills, granules or powders. Solutions, emulsions or suspensions of the compounds may be prepared for oral administration also. Sterile suspensions or solutions may be prepared for parenteral use. When desirable, the compound may be incorporated in suppositories for rectal administration.

The term unit dosage form as used in the specification and claims means a physically distinct entity suitable as a unitary dosage for administration, each unit containing a predetermined quantity of the compound of the present invention. The quantity of the compound contained in the unit dosage form is directly dependent upon the considerations which are well-known in the art of compounding a pharmaceutically active material for therapeutic use. The characteristics of the active compound, the particular therapeutic effect to be achieved, the route of administration and the mechanism of the action of the material in the host are important considerations in determining the quantity of the active compound included in the unit dosage form. Examples of suitable oral unit dosage forms are capsules, pills, tablets, cachets and powder packets for solid compositions, and teaspoonfuls, dropperfuls, ampoules vials for liquid oral dosage forms.

The tablets or pills can be laminated or otherwise compounded to provide for time-release action of the active compound. For example, the tablet or pill can comprise an inner portion constituting one unit dose and an outer portion constituting another unit dose, the outer portion being in the form of an envelope encompassing the inner portion. The two portions can be separated by an enteric layer which serves to delay the release of the active compound contained in the inner portion by resisting disintegration in the stomach thereby allowing it to pass intact ito the intestine where the enteric layer is destroyed releasing the active compound in the inner portion. Such an enteric layer may consist of any number of known substances such as polymeric derivatives or mixtures thereof, cellulose acetate, cetyl alcohol, shellac, cellulose acetate phthalate and the like.

Examples of oral liquid dosage forms include aqueous solutions, hydroalcoholic solutions, and aqueous or oil suspensions and emulsions wherein the product is dissolved or dispersed in a pharmaceutically acceptable carrier or vehicle. Flavoring agents may be added to increase the palatability of the dosage form. Examples of vehicles are cottonseed oil, sesame oil, peanut oil and the like and acceptable dispersing agents for aqueous suspensions include synthetic and natural gums such as tragacanth, acacia, dextran, methyl cellulose and the like.

Suppositories containing the compounds of the instant invention can be readily prepared in a unit dosage form by mixing the active ingredient with a commonly used suppository base such as theobroma oil, glycerinated gelatin or a polyethylene glycol, and then shaping the mass into a form suited for introduction into the rectum.

A preferred embodiment of the present invention is a compound having the formula

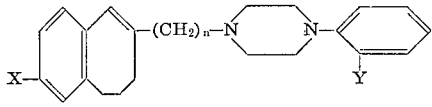

in which $n$ is an integer of 2 or 3, X is hydrogen or fluoro, and Y is (lower)alkoxy; and a nontoxic, pharmaceutically acceptable salt thereof.

A more preferred embodiment is a compound having the formula

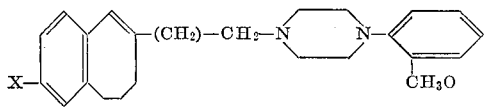

in which X is hydrogen or fluoro; and a nontoxic, pharmaceutically acceptable salt thereof.

A most preferred embodiment of the present invention is the compound having the formula

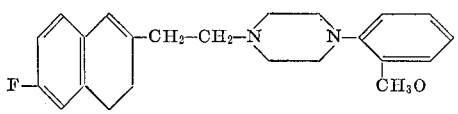

and a nontoxic pharmaceutically acceptable salt thereof.

The most preferred embodiment of the present invention is the mono- or dihydrochloride salt of the compound having the formula

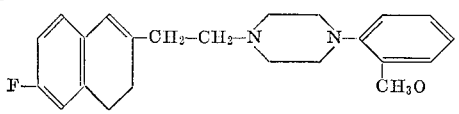

The objectives of the present invention have been achieved, by the provision according to the present invention, of the process which comprises the following consecutive steps:

(A) An excess of magnesium chips, preferably a 10% to 75% molar excess, is reacted with 1 mole of 3-bromofluorobenzene, in an acceptable Grignard reaction solvent, such as tetrahydrofuran (THF), diethyl ether (or a higher homologue), dioxane, diglyme, benzene, or mixtures thereof, at temperatures in the range of 20° C. to reflux temperatures, but preferably at reflux temperatures to produce "in situ" the 3-fluorophenylmagnesium bromide.

The "in situ" solution of Grignard reagent was cooled and a small molar excess (one mole plus ayout 10%) of allyl bromide dissolved in the same solvent as used above was added to the reaction mixture at a rate sufficient to maintain vigorous refluxing. The mixture was stirred and refluxed for one hour. The suspension was cooled, diluted with solvent (THF) and water added dropwise with vigorous stirring to decompose any remaining Grignard reagent. When the initial reaction stopped, sufficient water was added to dissolve the salt.

The layers were separated and the aqueous layer extracted with several portions of an immiscible solvent such as ether, benzene, chloroform, ethyl acetate, and the like. The combined organic solutions were dried over anhydrous MgSO$_4$, filtered and evaporated. The residues were distilled to yield 3-allylfluorobenzene.

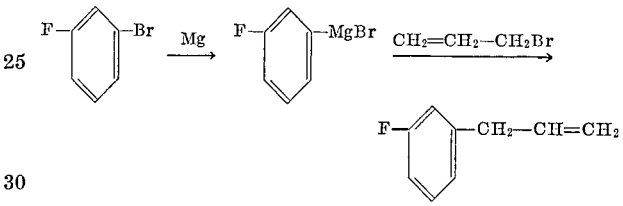

(B) A solution of one mole of maleic anhydride in o-dichlorobenzene or some like solvent i.e., benzene, xylene, toluene or the like, was reacted with one mole of 3-allylfluorobenzene at reflux temperatures for about 10 to 60 hours. The solvent was removed under reduced pressure and the residue was fractionated by distillation to yield 3-(3-fluorophenyl)allylsuccinic anhydride. .

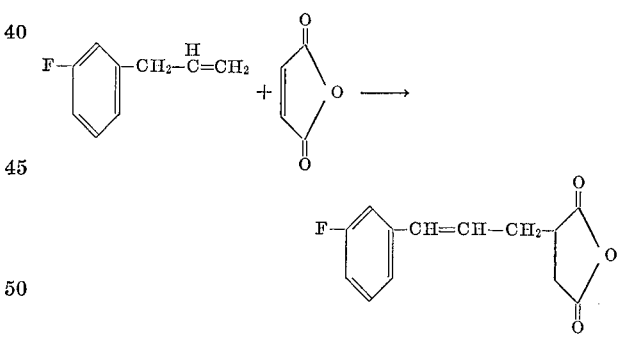

(C) The 3 - (3 - fluorophenyl)allylsuccinic anhydride was hydrogenated using a catalyst such as platinum oxide, palladium oxide, or the like, in the presence of an inert solvent such as dioxane, tetrahydrofuran, benzene, or the like.

The catalyst was removed and the solvent evaporated under reduced pressure to produce the intermediate compound, 3-(3-fluorophenyl)propylsuccinic anhydride as an oil.

A solution of the 3-(3-fluorophenyl)propylsuccinic anhydride was prepared using nitrobenzene as the solvent. This solution was added slowly to a previously prepared nitrobenzene solution of aluminum chloride (one molar excess) which was cooled to below 0° C. in an ice-salt bath.

The cooling bath was removed and the solution stirred at ambient temperatures for about 60 to 120 hours. The reaction mixture was decomposed by the cautious addition of water and concentrated hydrochloric acid. The nitrobenzene was removed by steam distillation. The remaining residue was chilled in an ice bath, the water decanted, and the semi-solid dissolved in ether. The ether solution was washed with water and brine, decolorized by charcoal, filtered and dried over anhydrous MgSO₄.

The product, 7-fluoro-1-benzosulberone-2-acetic acid, was crystallized by the evaporation of most of the ether and the addition of "Skellysolve B" (petroleum solvent, B.P. 60–68° C., essentially n-hexane) until the solution clouded. Scratching the glass initiated crystallization of the solid product.

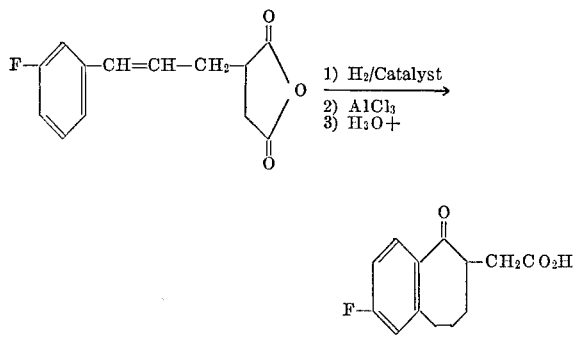

(D) The 7 - fluoro-1-benzosuberone-2-acetic acid was dissolved in methylene chloride, or some similar inert solvent such as chloroform, benzene, ether, xylene, or the like, to which was added with cooling, about an equimolar quantity of a tertiary amine such as trimethylamine, triethylamine, pyridine, or the like. The solution was cooled below 0° C. by an ice-salt bath and about an equimolar quantity of redistilled iso-butyl chloroformate dissolved in the solvent employed above, preferably methylene chloride, was added dropwise. The solution was stirred for one hour at about 0° C. and then an equimolar quantity of 1-(2-methoxyphenyl)piperazine dissolved in methylene chloride (or a solvent as above) was added dropwise. The mixture was allowed to slowly warm to ambient temperatures with rapid stirring. Stirring was continued for 15 hours.

The organic solution was washed with water, several portions of dilute sodium bicarbonate solution, then saturated brine. The methylene chloride solution was treated with decolorizing charcoal, filtered, and dried over anhydrous magnesium sulfate. The solvent was removed in vacuo to yield a dark oil. Slurrying the oil in ether produced a yellow solid, M.P. 104–106° C. determined to be 1-(7 - fluoro-1-benzosuberone-2-acetyl)-4-(2-methoxyphenyl)piperazine.

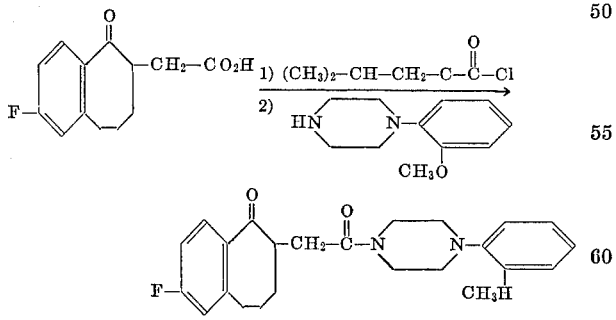

(E) A solution of 1-(7-fluoro-1-benzosuberone-2-acetyl)-4 - (2 - methoxyphenyl)piperazine in anhydrous THF, or some other acceptable solvent such as diethyl ether, or a homologue thereof, or benzene, dioxane, diglyme, or the like, was added to a refluxing suspension of about 0.5 molar excess of lithium alumnum hydride at a sufficient rate to maintain a controlled reflux. The mixture was stirred and refluxed for 16 hours after addition, cooled, and decomposed by the dropwise addition of water. The inorganic salts were removed by filtration. The solvent was evaporated in vacuo to yield an amber residue determined to be 1-[2-(7-fluoro-1-hydroxy-2-benzosuberyl)ethyl]-4-(2-methoxyphenyl)piperazine.

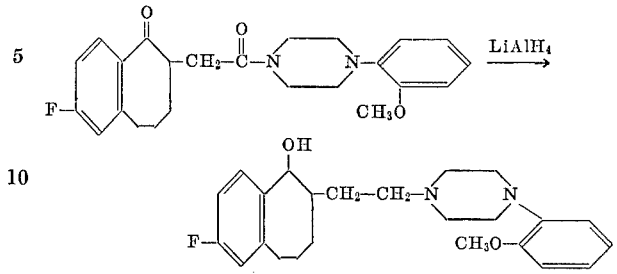

(F) Concentrated sulfuric acid diluted with two parts of water is slowly added to a solution of 1-[2-(7-fluoro-1-hydroxy - 2 - benzosuberyl)-ethyl]-4-(2-methoxyphenyl) piperazine in an equal volume of 95% ethanol. The solution was refluxed for sixteen hours, cooled and placed in an ice bath while 40% sodium hydroxide solution was added to neutralize the acid. The product was collected by several chloroform extractions, which were washed with water, dried over sodium sulfate, filtered and evaporated in vacuo. The residues were dissolved in ether and converted to the hydrochloride salt by bubbling anhydrous hydrogen chloride through the solution. The colorless solid so formed was the desired product, 8,9-dihydro-2 - fluoro - 6 - {2-[2-methoxyphenyl)-1-piperazyl]ethyl}-7H-benzocycloheptene hydrochloride.

When in the formula

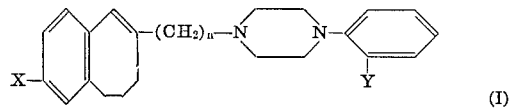

$n$ is 3, the process for preparation is somewhat different in the first few steps.

1-benzosuberone was treated with 2-molar equivalents of pyrrolidine in the presence of a catalytic amount of a strong acid, preferably p-toluenesulfonic acid, by refluxing in xylene for ten to thirty hours, azeotropically removing the water of reaction. The solvents and excess pyrrolidine were removed in vacuo. The enamine residue was mixed with a 15 to 30% molar excess of ethyl acrylate and anhydrous methanol and was subsequently refluxed for about 65 hours. The solution was evaporated in vacuo until an oil began to separte. A solution of 10% sodium hydroxide was added and the mixture was refluxed to saponify the ester.

The resultant solution was cooled, extracted once with ether to remove any unhydrolyzed ester, and then acidified with 6N hydrochloric acid. The oil which separated solidified on cooling. The solid was identified as 3-(1-oxo-2-benzosuberyl)propionic acid.

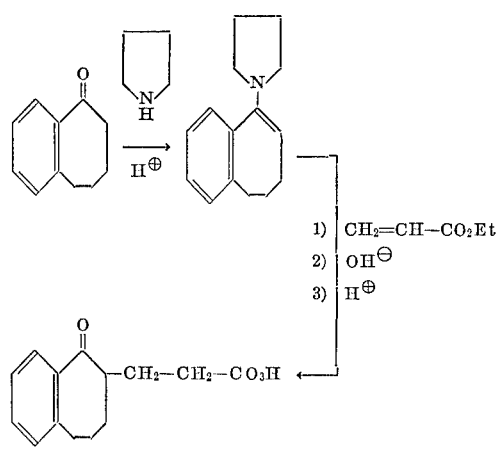

Insertion of the 3-(1-oxo-2-benzosuberyl)propionic acid into the procedure described under (D), (E), and (F) produces the compounds of Formula I wherein $n$ is 3.

Pharmocological evaluation has indicated the compounds of the present invention possess central nervous system depressant activity.

In brief, it has been shown that 8,9-dihydro-2-fluoro-6-{2-[4-(2 - methoxyphenyl)-1-piperazyl]-ethyl}-7H-benzocycloheptene hydrochloride (II) exhibited a significant activity in accepted tests designed to measure the calming properties of test compounds in experimental animals.

The inhibition of the condition avoidance response in the rat has been determined using the procedure described by Cook, L. and Weidley, E. (Ann. N.Y. Acad. Sci., 66 (3) 740, 1957). The prevention of the mouse fighting behavior induced by the foot electroshock has been measured by the technique presented by Tedeschi, R. E., et al. (J. Pharmacol, 125:28. 1959). A minimum of 5 doses was used to establish the dose response relationship and the dose (mg./kg. per os.) producing an effect in 50 percent of the animals has been defined as $ED_{50}$. The acute toxicity has been determined by giving graded doeses of compound in the mouse and rat and the dose (mg./kg./os.) causing deaths in 50 percent of the animals has been defined as $LD_{50}$. In all experiments compounds II was administered orally in aqueous medium containing Tween as a suspending agent. The findings are summarized in Table I.

For example, the compounds having the formulas

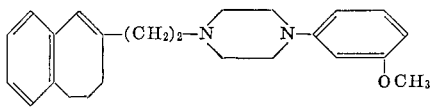

and

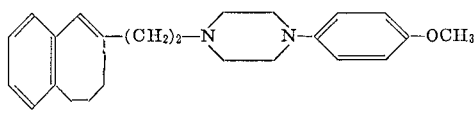

are both inactive as central nervous system depressants.

Furthermore, compounds corresponding to the compounds of the present invention possessing oxygen functions in the 5 position of the benzocycloheptene ring were inactive as central nervous system deprassants, i.e.;

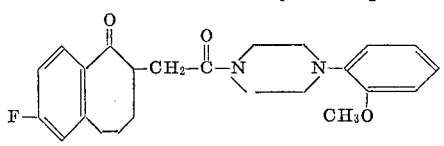

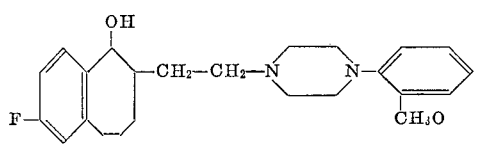

TABLE I

[Inhibition of conditioned avoidance response and fighting behavior and acute toxicity of Compound II in the rat and mouse]

| Test | Species | Results | $LD_{50}/ED_{50}$ ratio |
|---|---|---|---|
| Conditioned avoidance | Rat | $ED_{50}$ mg./kg. p.o.—10 | 49 |
| Acute toxicity | Rat | $LD_{50}$ mg./kg. p.o.—493 [1] | |
| Fighting behavior | Mouse | $ED_{50}$ mg./kg. p.o.—40 | 8 |
| Acute toxicity | do | $LD_{50}$ mg. kg. p.o.—320 [1] | |

These findings show that Compound II had a significant and selective calming activity at doses which were considerably lower, 23–227 times lower, than those producing lethal response.

Compound II also exhibited significant central nervous system depression in the cat, dog, and monkey at 10 to 20 mg./kg.

Similar studies conducted on chlorpromazine produced results indicated in Table II.

In the treatment of diseases and conditions in animals, including man, in which the use of a central nervous system depressant, i.e., calmative, sedative, tranquilizer, or the like, is desirable, the compounds of the present invention may be administered orally or parenterally in accordance with conventional procedures in an amount of from about 0.05 mg./kg./dose to 15 mg./kg./dose depending upon the route of administration, the particular compound of the invention and the severity of the condi-

TABLE II

[Inhibition of conditioned avoidance response and fighting behavior and acute toxicity of chlorpromazine in the rat and mouse]

| Test | Species | Results | $LD_{50}/ED_{50}$ ratio |
|---|---|---|---|
| Conditioned avoidance | Rat | $ED_{50}$ mg./kg. p.o.—10 | 49 |
| Acute toxicity | Rat | $LD_{50}$ mg./kg. p.o.—493 [1] | |
| Fighting behavior | Mouse | $ED_{50}$ mg./kg. p.o.—40 | 8 |
| Acute toxicity | do | $LD_{50}$ mg./kg. p.o.—320 [1] | |

[1] Drug Dosage in Laboratory Animals, C.D. Barnes and L.G. Eltherington, University of California Press, Berkeley, California (1966).

Preliminary results would seem to indicate compound II possesses potency of a magnitude comparable to chlorpromazine.

It is interesting to note however, that the activity residing in the compounds of Formula I is highly dependent upon its structure, in particular the position of the (lower) alkoxy group represented by Y.

tion being treated. The preferred dosage for the compounds of the present invention is in the range of about 0.05 to about 3 mg./kg./dose three to four times a day.

In particular, the oral dose in man of the compound II, 8,9-dihydro - 2 - fluoro-6-{2-[4-(2-methoxyphenyl)-1-piperazyl]-ethyl}-7H-benzocycloheptene hydrocrloride, is in the range of about 2 mg. to about 750 mg. three to four times a day and most preferably in the range of about 5 mg. to about 50 mg. three to four times a day.

Initial pharmacological testing seems to indicate that compound II bears some relationship in its $ED_{50}$ and $LD_{50}$ data to chlorpromazine (Reference—Drug Dosage in Laboratory Animals by C. D. Barnes and L. G. Eltherington, University of California Press, Berkeley, Calif. (1966).

The following examples will serve to illustrate but not to limit the scope of the present invention.

DESCRIPTION OF THE PREFERRED EMBODIMENTS (A) 3-allylfluorobenzene.—The requisite apparatus was flame-dried and flushed with nitrogen. A slow nitrogen sweep was maintained throughout the reaction. The flask was charged with 120.5 g. (4.96 moles) of stress-cracked magnesium "chips" and 150 ml. of anhydrous tetrahydrofuran (THF). The stirrer was started and 25 ml. of 3-bromofluorobenzene was added. The reaction began immediately. THF (350 ml.) was added at once and and the reaction moderated. The remainder of 500 g. (2.86 moles) of 3-bromofluorobenzene in 400 ml. of anhydrous THF was then added at a rate sufficient to maintain vigorous reflux (approximately 80 minutes). The mixture was stirred and refluxed for 10 minutes on a steam bath. The heat source was removed and 259 ml. (362 g., 3 moles) of allyl bromide in 400 ml. of anhydrous THF was added at a rate maintaining vigorous reflux (approximately 75 minutes). The mixture was then stirred and refluxed for one hour. The suspension was cooled in an ice bath, diluted with 300 ml. of THF, and water was added dropwise with vigorous stirring. After approximately 100–125 ml. had been added, a precipitate stopped the stirrer. An additiinal 1000 ml. of $H_2O$ was run in rapidly and the salt was broken up with a stirring rod. After complete solution of the salt, the mixture was filtered through cotton, the layers were separated, and the aqueous layer was extracted with 3 portions of ether. Emulsions were broken by filtration through a filter aid. The combined organic solutions were dried over anhydrous $MgSO_4$ and evaporated. Distillation of the residue gave 247.4 g. (64%) of a colorless oil, B.P. 157–161°.

Analysis.—Cal'd for $C_9H_9F$ (percent): C, 79.38; H. 6.66. Found (percent): C, 79.38; H. 7.00.

(B) 3-(3-fluorophenyl)allylsuccinic anhydride.—As solution of 177.5 g. (1.81 moles) of maleic anhydride and 247.4 g. (1.81 moles) of 3-allylfluorobenzene in 450 ml. of o-dichlorobenzene was refluxed for 46 hours. The solvent was removed under reduced pressure and the residue was fractionated. Steam was passed through the condenser to aid flow of the viscous material. An extremely efficient heat source was required to force the product over; use of an open flame with strict exclusion of drafts was necessary in this experiment. After a small forerun, 262.7 g. (62%) of a yellow oil was obtained, B.P. 186–205°/0.15–0.4 mm. Upon scratching the product crystallized, M.P. 74–76.5°.

Analysis.—calc'd for $C_{13}H_{11}FO_3$ (percent): C, 66.66; H, 4.73. Found (percent): C, 66.42; H, 4.88.

(C) 7-fluoro-1-benzosuberone-2-acetic acid.—A solution of 262.7 g. (1.12 moles) of 3-(3-fluorophenyl)allylsuccinic anhydride in 500 ml. of anhydrous dioxane was hydrogenated in the presence of 2.0 g. of $PtO_2$ at an initial pressure of 38 p.s.i.g. After 1 hour hydrogenation, absorption was complete (93% of theory). The catalyst was filtered and the solvent was evaporated under reduced pressure to yield 264 g. (100%) of a foul-smelling amber oil, 3-(3-fluorophenyl)propylsuccinic anhydride.

Anhydrous $AlCl_3$ (232 g., 1.74 moles) was dissolved with stirring in 750 ml. of nitrobenzene. The solution was cooled to <0° in an ice-salt bath, and a solution of 205.2 g. (0.869 mole) of crude 3-(3-fluorophenyl) propylsuccinic anhydride in 750 ml. of nitrobenzene was added in a thin stream. The cooling bath was then removed and the solution was stirred at ambient temperature for 90 hours. The mixture was decomposed by the cautious addition of 500 ml. of water and 150 ml. of concentrated HCl. The nitrobenzene was steam distilled (approximately 14 hours). The mixture remaining was chilled in an ice bath, the water was decanted, and the semi-solid mass was taken up in ether. The ether solution was washed with water and brine, treated with Norit, filtered, and dried over anhydrous $MgSO_4$.

The ethereal solution was evaporated to approximately 800 ml. and "Skellysolve B" (petroleum solvent, B.P. 60–68° C. essentially n-hexane) was added to the cloud point at the boil. The cloudiness was removed with a little ether and the solution was scratched and stored at 5°. Filtration gave 159.5 g. (78%) of light yellowish solid, M.P. 96–98.5°.

Analysis.—calc'd for $C_{13}H_{13}FO_3$ (percent): C, 66.09; H, 5.55. Found (percent): C, 66.31; H, 5.63.

(D) 1 - (7 - fluoro - 1 - benzosuberone - 2 - acetyl) - 4 - (2 - methoxyphenyl) - piperazine.—1 - (2 - methoxyphenyl)piperazine dihydrochloride hydrate (338.4 g., 1.2 moles) was decomposed with dilute $Na_2CO_3$ solution. The watersoluble base was extracted out with $CH_2Cl_2$; the combined extracts were dried over anhydrous $MgSO_4$ and this solution was used directly in the subsequent reaction.

To a stirred solution of 291.5 g. (1.2 moles) of 7-fluoro-1-benzosuberone-2-acetic acid in 800 ml. of $CH_2Cl_2$ was added, with cooling, 168 ml. (121 g., 1.2 moles) of triethylamine. The solution was cooled to <0° in an ice-salt bath and 158 ml. (164 g., 1.2 moles) of redistilled isobutyl chloroformate was added dropwise in 500 ml. of $CH_2Cl_2$. The mixture was then stirred at <0° for 1 hour. The amine solution was then added dropwise and the mixture was allowed to warm slowly to ambient temperature and was stirred for 16 hours.

The organic solution was washed with water, 4 portions of dilute $NaHCO_3$ solution, and saturated brine. The solution was treated with Norit, filtered, and dried over anhydrous $MgSO_4$. Evaporation of the solvent gave a dark oil which was stripped at 100°/0.7 mm. Upon solution of the oil in ether a pale yellow solid separated, M.P. 104–106°. Yield was 212 g. (43%).

An analytical sample was recrystallized from acetone-"Skellysolve B," M.P. 105.5–109°.

Analysis.—Calc'd for $C_{24}H_{27}FN_2O_3$ (percent): C, 70.24; H, 6.58; N, 6.82. Found (percent): C, 70.08; H, 6.45; N, 6.81.

From the $NaHCO_3$ extracts approximately 100 g. (34%) of 7-fluoro-1-benzosuberone-2-acetic acid was recovered.

(E) 1 - [2 - (7 - fluoro - 1 - hydroxy - 2 - benzosuberyl) - ethyl] - 4 - (2 - methoxyphenyl)piperazine.— A solution of 53.0 g. (0.129 mole) of 1-(7-fluorobenzosuberone-2-acetyl)-4-(2-methoxyphenyl)piperazine in 500 ml. of anhydrous THF was added to a stirred, refluxing suspension of 7.6 g. (0.2 mole) of lithium aluminum hydride in 500 ml. of anhydrous THF at a rate sufficient to maintain reflux. The mixture was then stirred and refluxed for 16 hours, cooled, and decomposed by the sequential dropwise addition of 7.6 ml. of water, 7.6 ml. of 15% NaOH solution, and 22.8 ml. of water. The inorganic salts were filtered and the filter cake was washed well with THF. The solvent was evaporated and the amber residue was stripped at 100°/15 mm. The crude yield was 51.3 g. (99%). An analytical sample was further stripped at 100°/0.2 mm.

Analysis.—Calc'd for $C_{24}H_{31}FN_2O_2$ (percent): C, 72.35; H, 7.78; N, 7.04. Found (percent): C, 72.40; H, 7.98; N, 6.80.

(F) 8,9 - dihydro - 2 - fluoro - 6 - {2-[4-(2-methoxyphenyl) - 1 - piperazyl]-ethyl}-7H-benzocyloheptene hydrochloride.—Concentrated sulfuric acid (340 ml.) and 680 ml. of water were slowly and cautiously added to a solution of 1 - [2 - (7-fluoro-1-hydroxy-2-benzosuberyl)- ethyl]-4-(2-methoxyphenyl) piperazine in 850 ml. of ethanol. The solution was refluxed for 16 hours, cooled, and placed in an ice bath while 40% NaOH solution was added to alkaline reaction. Water was added to dissolve precipitated salts and the oily product was extracted out with chloroform. The combined extracts were washed with water and evaporated. The residue was taken up in approximately 1500 ml. of anhydrous ether and anhydrous HCl was bubbled through until precipitation ceased. The colorless solid was filtered, washed with ether, and recrystallized from methanol and then from ethanol to give 40 g. (68.5%) of colorless crystals, M.P. 232–234° (decomposition).

*Analysis.*—Calc'd for $C_{24}H_{29}FN_2O \cdot HCl$ (percent): C, 69.13; H, 7.25; N, 6.72; Cl, 8.50. Found (percent): C, 68.92; H, 7.34; N, 6.80; Cl, 8.36.

In one experiment a dihydrochloride was obtained, M.P. 230–231°.

*Analysis.*—Calc'd for $C_{24}H_{29}FN_2O \cdot 2HCl$ (percent): C, 63.57; H, 6.84; N, 6.18. Found (percent): C, 63.31; H, 6.55; N, 5.94.

Example II 1-benzosuberone-2-acetic acid.—This material could be prepared according to the literature. (W. J. Horton, H. W. Johnson and J. L. Zollinger, J. Am. Chem. Soc., 76, 4588 (1954). The following improved procedure was developed:

1-benzosuberone (43.5 g., 0.268 mole), 38.1 g. (0.536 mole) of pyrrolidine, and 100 mg. of p-toluenesulfonic acid were refluxed in 1000 ml. of xylene under a water separator for 18 hours. The orange solution was cooled and solvent and excess pyrrolidine were removed under reduced pressure. The residual enamine was mixed with 35.8 mls. (53.8 g., 0.322 mole) of ethyl bromoacetate and 400 ml. of anhydrous methanol and the solution was refluxed for 65 hours. Water (60 ml.) was added and refluxing was continued for 2.5 hours. The dark solution was evaporated under reduced pressure until an oil began to separate; 400 ml. of 10% NaOH solution was then added and the mixture was refluxed for 17 hours.

The solution was cooled and extracted once with ether. The aqueous layer was heated to expel ether and acidified with 6N HCl. The oil which separated solidified upon cooling. The solid was filtered, dried, and recrystallized from toluene to yield 49.8 g. (85%) of light yellowish solid, M.P. 131.5–133.5°.

In two experments a crystalline modification of the product, M.P. 108–109°, was isolated.

Example III

3 - (1 - oxo - 2 - benzosuberyl)propionic acid.—1-benzosuberone pyrrolidine enamine was prepared as described in Example II from 1-benzosuberone (35.0 g., 0.218 mole. (25.6 g., 0.36 mole) of pyrrolidine, 100 mg. of p-toluenesulfonic acid, and 500 ml. of xylene. The crude enamine was mixed with 150 ml. of anhydrous dioxane and 31.8 ml. (29.4 g., 0.294 mole) of freshly distilled ethyl acrylate and the solution was refluxed for 67 hours. Water (25 ml.) was cautiously added and refluxing was continued for one hour. The solvents were evaporated and the residue was stripped at 100°/0.2 mm.

The residue was refluxed in 150 ml. of 10% NaOH solution and 75 ml. of ethanol for 3 hours. The solution was cooled, diluted with water, and extracted with ether. The aqueous solution was boiled to expel ether, cooled, and acidified with concentrated HCl. An oil separated, which solidified upon cooling and scratching. The solid was dissolved in ethanol and treated with Norit. The mixture was filtered, the filtrate was evaporated, and the residue was recrystallized from ether-Skellysolve B, M.P. 97–99°. The yield of straw-colored crystals was 23.9 g. (47%). One preparation gave a crystalline modification, M.P. 84–85.5°.

*Analysis.*—Calc'd for $C_{14}H_{16}O_3$ (percent): C, 72.39; H, 6.94. Found (percent): C, 72.29; H, 6.89.

Example IV 8,9 - dihydro - 6 - {2 - [4-(2-methoxyphenyl)-1-piperazyl]-ethyl}-7H-benzocycloheptene hydrochloride.—Substitution in the procedures of Example I, part D of 1-benzosuberone-2-acetic acid for the 7-fluoro-1-benzosuberone-2-acetic acid used therein produced 8,9-dihydro-6-{2-[4 - (2 - methoxyphenyl)piperazyl]-ethyl}-7H-benzocycloheptene hydrochloride, M.P. 247.5–249° C.

*Analysis.*—Calc'd for $C_{24}H_{30}N_2O \cdot HCl$ (percent): C, 72.27; H, 7.78; N, 7.03. Found (percent): C, 72.01; H, 8.00; N, 6.84.

Example V 8,9 - dihydro - 6 - {3 - [4 - (2 - methoxyphenyl)-1-piperazyl] - propyl} - 7H - benzocycloheptene hydrochloride.—Substitution in the procedures of Example I, part D of 3-(1-oxo-2-benzosuberyl)propionic acid for the 7-fluoro - 1 - benzosuberone - 2 - actic acid used therein produces 8,9 - dihydro - 6 - {3 - [4 - (2-methoxyphenyl)-1 - piperazyl] - propyl} - 7H-benzocycloheptene hydrochloride.

Example VI 8,9 - dihydro - 2 - fluoro - 6 - {2-[4-(2-ethoxyphenyl)-1 - piperazyl] - ethyl} - 7H-benzocycloheptene hydrochloride.—Substitutions in the procedure of Example I, part D of 1-(2-ethoxyphenyl)piperazine dihydrochloride hydrate for the 1-(2-methoxyphenyl) piperazine dihydrochloride hydrate used therein produces 8,9-dihydro-2-fluoro - 6 - {2 - [4 - (2-ethoxyphenyl)-piperazyl]-ethyl}-7H-berzocycloheptene hydrochloride.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

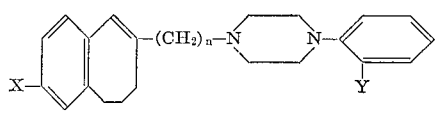

in which:

$n$ is an integer of 2 or 3,

X is hydrogen or fluoro, and

Y is (lower)alkoxy; and a nontoxic, pharmaceutically acceptable salt thereof.

2. The compounds of claim 1 having the formula

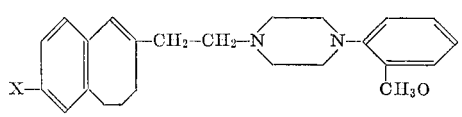

in which:

X is hydrogen or fluoro; and a nontoxic, pharmaceutically acceptable salt thereof.

3. The compound of claim 1 having the formula

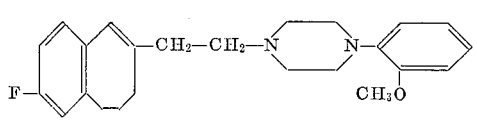

and a nontoxic, pharmaceutically acceptable salt thereof.

4. The mono- and dihydrochloride salts of the compound of claim 3.
5. The compound of claim 1 having the formula
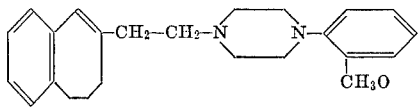
and a nontoxic, pharmaceutically acceptable salt thereof.
6. The mono- and dihydrochloride salts of the compound of claim 5.
References Cited
UNITED STATES PATENTS
| 3,030,367 | 4/1962 | Janssen | 260—268 |
| 3,146,235 | 8/1964 | Nichols | 260—268 |
| 3,180,867 | 4/1965 | Shapiro | 260—268 |
DONALD G. DAUS, Primary Examiner
U.S. Cl. X.R.
260—294.7, 326.81, 346.8, 520, 650, 690; 424—250

PO-1050
(5/69)

UNITED STATES PATENT OFFICE
CERTIFICATE OF CORRECTION

Patent No. 3,547,923     Dated December 15, 1970

Inventor(s) Robert Ted Standridge and Barbara Ann Hall

It is certified that error appears in the above-identified patent and that said Letters Patent are hereby corrected as shown below:

The formula of claim 2 should read as follows:

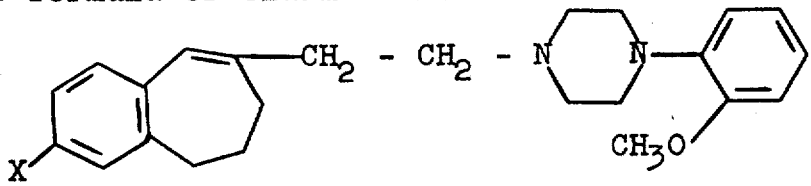

(column 12, lines 58-62)

The formula of claim 5 should read as follows:

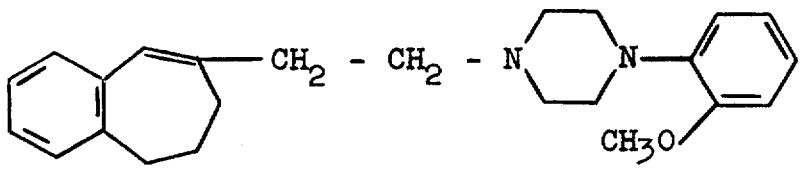

(column 13, lines 4-8)

SIGNED AND
SEALED
MAR 16 1971

(SEAL)
Attest:

Edward M. Fletcher, Jr.
Attesting Officer

WILLIAM E. SCHUYLER, JR.
Commissioner of Patents